(12) United States Patent
Tudor et al.

(10) Patent No.: US 11,117,673 B2
(45) Date of Patent: Sep. 14, 2021

(54) METHOD AND SYSTEM FOR RETAINING OFF-WING EVACUATION SLIDE BLOWOUT PANEL

(71) Applicant: GOODRICH CORPORATION, Charlotte, NC (US)

(72) Inventors: Bruce Tudor, Mesa, AZ (US); Guangqing Shen, Tempe, AZ (US)

(73) Assignee: Goodrich Corporation, Charlotte, NC (US)

( * ) Notice: Subject to any disclaimer, the term of this patent is extended or adjusted under 35 U.S.C. 154(b) by 203 days.

(21) Appl. No.: 16/453,698

(22) Filed: Jun. 26, 2019

(65) Prior Publication Data

US 2020/0407069 A1  Dec. 31, 2020

(51) Int. Cl.
*B64D 25/14* (2006.01)
(52) U.S. Cl.
CPC .................... *B64D 25/14* (2013.01)
(58) Field of Classification Search
CPC ...... B64D 25/14; B64C 1/1492; B64C 1/1423
See application file for complete search history.

(56) References Cited

U.S. PATENT DOCUMENTS

| 5,102,070 A * | 4/1992 | Smialowicz | B64D 25/14 182/48 |
|---|---|---|---|
| 6,457,677 B2 * | 10/2002 | Dazet | B64D 25/14 244/137.1 |
| 6,761,337 B2 * | 7/2004 | Baderspach | B64D 25/14 244/137.2 |
| 2002/0162916 A1 * | 11/2002 | Baderspach | B64D 25/14 244/137.2 |
| 2006/0266888 A1 * | 11/2006 | Matsch | B64C 1/1423 244/137.2 |
| 2008/0099621 A1 * | 5/2008 | Hintzman | B64D 25/14 244/137.2 |

(Continued)

FOREIGN PATENT DOCUMENTS

| EP | 1142784 | 10/2001 |
|---|---|---|
| EP | 1254834 | 11/2002 |

(Continued)

OTHER PUBLICATIONS

Windhager: "Insektenschutz fur Ihre Fenster & Turen", Feb. 28, 2018 (Feb. 28, 2018), Retrieved from the Internet: URL:http://www.windhager.eu/index.php?eID= download&file=09068_DE_Insektenschutz_B2C_ Katalog_2018_02.pdf [retrieved on Jul. 20, 2020] pp. 12,13, 24, 31, fig. z6.*

(Continued)

*Primary Examiner* — Philip J Bonzell
*Assistant Examiner* — Tye William Abell
(74) *Attorney, Agent, or Firm* — Snell & Wilmer L.L.P.

(57) ABSTRACT

An aircraft includes a compartment assembly having a blowout panel and a packboard configured to stow an evacuation system. The blowout panel may comprise a cover having a bracket mount and a bracket coupled to the bracket mount. The bracket may comprise a mating portion, a flange extending from the mating portion, a curved portion extending from the flange away from the blowout panel, and a lip portion extending from the curved portion opposite the direction of the curved portion. The packboard may comprise a slot configured to receive the bracket.

13 Claims, 8 Drawing Sheets

(56) References Cited

U.S. PATENT DOCUMENTS

| | | | |
|---|---|---|---|
| 2017/0320583 A1 | 11/2017 | Schmidt et al. | |
| 2018/0072426 A1* | 3/2018 | Schmidt | B64D 25/14 |
| 2018/0210483 A1 | 7/2018 | Santiago | |
| 2019/0023407 A1* | 1/2019 | de Brito Teixeira | G05D 7/0617 |

FOREIGN PATENT DOCUMENTS

| | | |
|---|---|---|
| EP | 1911674 | 4/2008 |
| EP | 3241752 | 11/2017 |
| RU | 2628282 | 8/2017 |

OTHER PUBLICATIONS

Windhager: "Insektenschutz fur Ihre Fenster & Turen", Feb. 28, 2018 (Feb. 28, 2018), XP055716411, Retrieved from the Internet: URL:http://www.windhager.eu/index.php?eID= download&file= 09068 DE Insektenschutz B2C Katalog 2018 02.pdf [retrieved on Jul. 20, 2020], p. 31; figure 26.

* cited by examiner

METHOD AND SYSTEM FOR RETAINING OFF-WING EVACUATION SLIDE BLOWOUT PANEL

FIELD

The present disclosure relates to aircraft systems and, in particular, to systems for retaining off-wing evacuation slide blowout panels.

BACKGROUND

Emergency evacuation systems may be used to exit an aircraft absent a jet way or other suitable means of egress for passengers. The evacuation system may deploy from the side of an aircraft fuselage, for example through a compartment assembly having a blowout panel and a packboard.

SUMMARY

A blowout panel for use in an aircraft evacuation system, in accordance with various embodiments, is disclosed herein. The blowout panel comprises a cover and a first bracket. The cover may have a first bracket mount disposed proximate a first edge of the cover. The first bracket may comprise a mating portion, a flange, a curved portion, and a lip portion. The mating portion may be coupled to the first bracket mount. The flange may extend from the mating portion toward the first edge of the cover. The curved portion may extend from the flange away from the cover. The lip portion may extend from the curved portion toward the first edge of the cover.

In various embodiments, the mating portion may be coupled to the first bracket mount via a mechanical fastener. The first bracket may be disposed proximate a second edge of the cover, the second edge extending orthogonal from the first edge and forming a first corner of the cover. The blowout panel may further comprise a second bracket, the second bracket disposed adjacent to the first bracket at a height from the first edge, the first bracket being the height from the first edge of the first bracket. The second bracket may be substantially similar to the first bracket. The blowout panel may further comprise a third bracket disposed adjacent to the second bracket at the height from the first edge. The blowout panel may further comprise a first plate disposed adjacent to the first bracket at a first width from the second edge, the first bracket being the first width from the second edge, the first plate configured to receive a ball lock.

An aircraft in accordance with various embodiments, is disclosed herein. The aircraft comprises a compartment assembly. The compartment assembly comprises a blowout panel and a packboard. The blowout panel may include a first bracket and a cover, the first bracket disposed proximate a first edge of the cover, the first bracket having a lip portion. The packboard may include a flange and a compartment disposed within the flange, the compartment comprising a bottom panel and a top panel, the bottom panel comprising a first slot disposed therein, the lip portion of the first bracket engaging the first slot.

The aircraft may further comprise a fuselage and a wing fixed to the fuselage, the compartment assembly disposed on the fuselage proximate the wing. The packboard may further comprise a grommet disposed in the first slot, the grommet engaging the lip portion of the first bracket. The first bracket may further comprise a mating portion, wherein the mating portion is mechanically coupled to the cover. The first bracket may be disposed proximate a second edge of the cover, the second edge extending orthogonal from the first edge and forming a first corner of the cover. The blowout panel may further comprise a second bracket, the second bracket disposed axially adjacent to the first bracket at a height from the first edge, the first bracket being the height from the first edge of the first bracket. The blowout panel may further comprise a third bracket disposed adjacent to the second bracket at the height from the first edge. The blowout panel may further comprise a first plate disposed adjacent to the first bracket at a first width from the second edge, the first bracket being the first width from the second edge. The packboard may further comprise a first ball lock disposed opposite the first slot, wherein the first ball lock is coupled to the first plate. The grommet may comprise a groove that engages an outer surface of the bottom panel, an inner surface of the bottom panel, and a perimeter surface of the first slot.

A method of assembling a compartment assembly for an aircraft evacuation system, in accordance with various embodiments, is disclosed herein. The method comprises engaging a plurality of brackets from a blowout panel in a plurality of respective slots from a packboard; pivoting the blowout panel about a hinge line created by an interface between the plurality of brackets and the plurality of respective slots, the pivoting being towards the packboard; and engaging a ball lock disposed on a top panel of the packboard in a respective plate disposed on a fuselage adjacent edge of the packboard.

The method may further comprise securing the blowout panel to the packboard. Each bracket in the plurality of brackets may comprises a lip portion, wherein each lip portion engages a respective slot in the plurality of respective slots.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction outward, or generally, away from a reference component. As used herein, "proximal" and/or "proximate" refers to a direction inward, or generally, towards the reference component.

Evacuation systems of the present disclosure may include inflatable slides having underwing tubes. In various embodiments, the underwing tubes may be configured to extend under the wing of an aircraft. The underwing tubes may be integral with the inflatable slide and may inflate upon the slide being deployed. Accordingly, in response to the inflatable slide being deployed, the underwing tubes may extend under the wing of the aircraft and may tend to prevent "kiting" or lifting of the slide.

Figure 1:
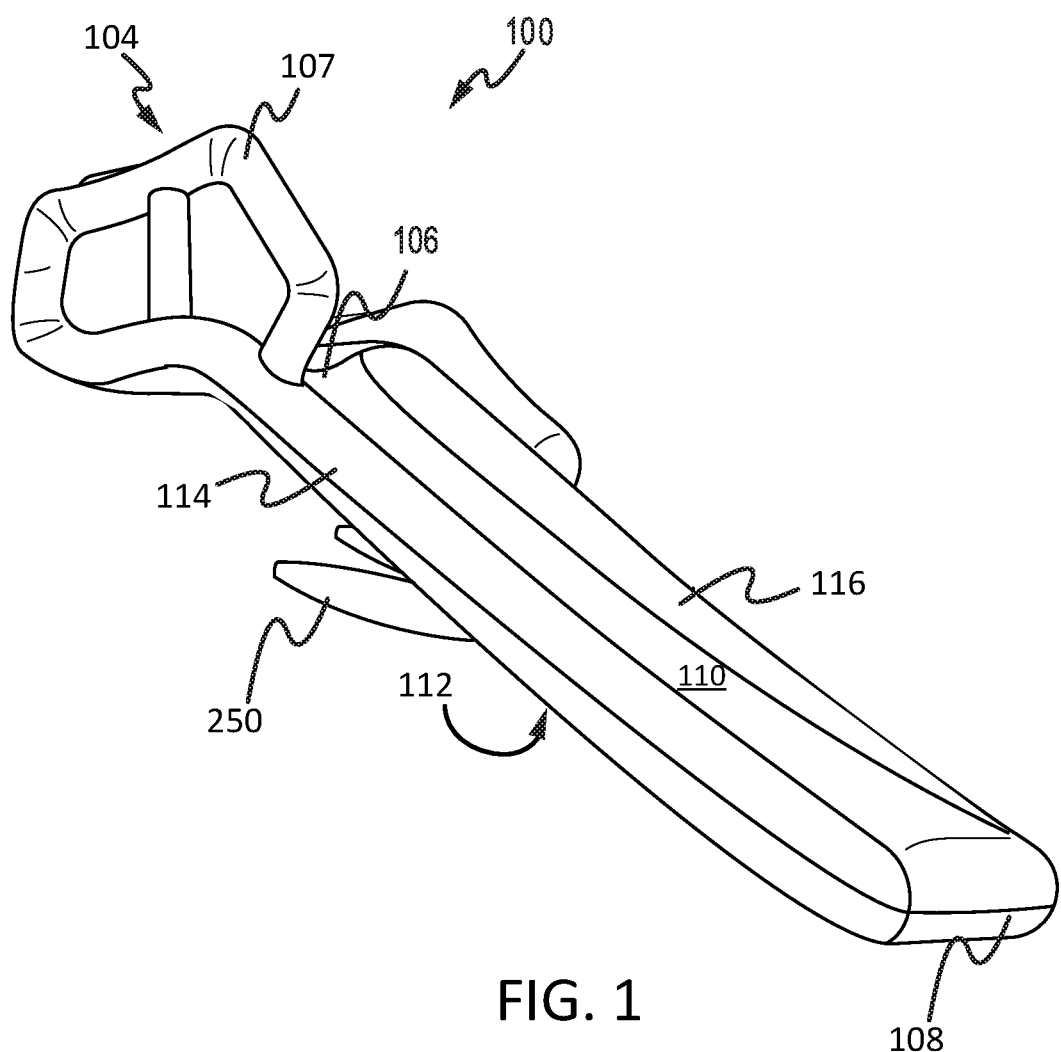
FIG. 1 illustrates a perspective view of an evacuation system, in accordance with various embodiments.

With reference to FIG. 1, an evacuation system 100 is illustrated, in accordance with various embodiments. Evacuation system 100 may comprise an evacuation slide 104. Evacuation slide 104 may comprise a head end 106 and a toe end 108, opposite head end 106. Head end 106 may be coupled to an aircraft structure. In various embodiments, a railing structure 107 may be coupled to head end 106. Evacuation slide 104 may comprise an inflatable slide. FIG. 1 illustrates evacuation slide 104 in an inflated and/or deployed position. Evacuation slide 104 may comprise a sliding surface 110 and an underside surface 112, opposite sliding surface 110. Sliding surface 110 may extend from head end 106 to toe end 108. Railing structure 107 may provide a lead-in to sliding surface 110. Evacuation slide 104 may comprise an outboard tube 114 and an inboard tube 116. Outboard tube 114 and inboard tube 116 may be disposed on opposing sides of evacuation slide 104. Outboard tube 114 and inboard tube 116 may be integrally formed and in fluid communication. Stated differently, outboard tube 114 and inboard tube 116 may be part of a one interconnected chamber that fills with gas upon deployment of evacuation slide 104. In various embodiments, evacuation system 100 may comprise one or more underwing tubes 250 coupled to evacuation slide 104. Evacuation slide 104 may comprise a single lane slide. However, evacuation slide 104 may comprise any number of lanes. Toe end 108 may contact an exit surface (e.g., the ground) in response to evacuation slide 104 being deployed.

Figure 2:
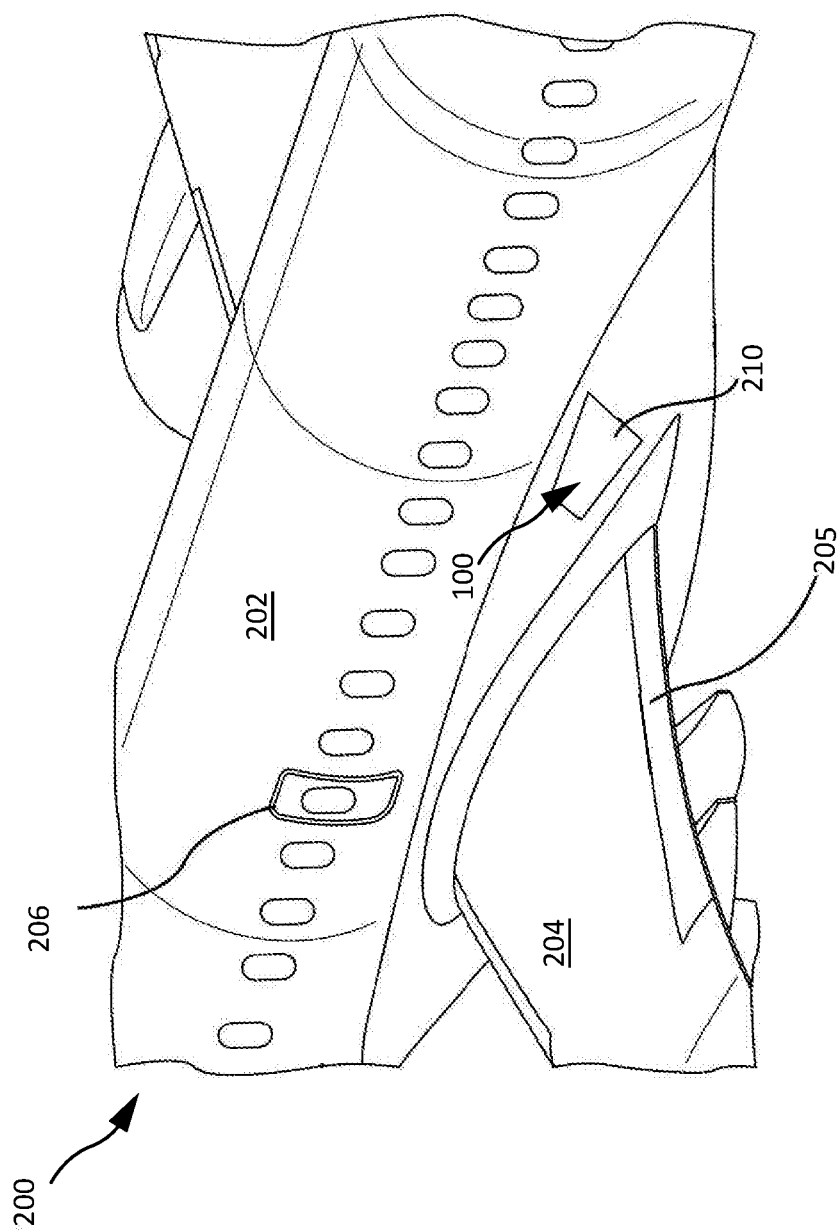
FIG. 2 illustrates a perspective view of a portion of an aircraft, in accordance with various embodiments.

Referring to FIG. 2, an exemplary aircraft 200 with evacuation system 100 in a stowed position is shown, in accordance with various embodiments. Aircraft 200 may comprise a fuselage 202 with wings 204 fixed to fuselage 202. Wings 204 may include one or more flaps 205. Emergency exit door 206 may be disposed on fuselage 202 over wing 204 such that passengers exiting emergency exit door 206 would exit onto wing 204. Evacuation system 100 may be installed on the aircraft 200 and may be disposed aft of emergency exit door 206. A blowout panel 210 may cover evacuation system 100. In this regard, with combined reference to FIG. 1 an FIG. 2, evacuation slide 104 may be stowed behind blowout panel 210. In various embodiments, evacuation slide 104 may be folded, when in the stowed position. In response to emergency exit door 206 opening or in response to another evacuation event, evacuation system 100 may jettison blowout panel 210 and evacuation slide 104 may be deployed. In various embodiments, evacuation system 100 may include and/or be housed within a packboard, which may be mounted to aircraft 200.

Figure 3:
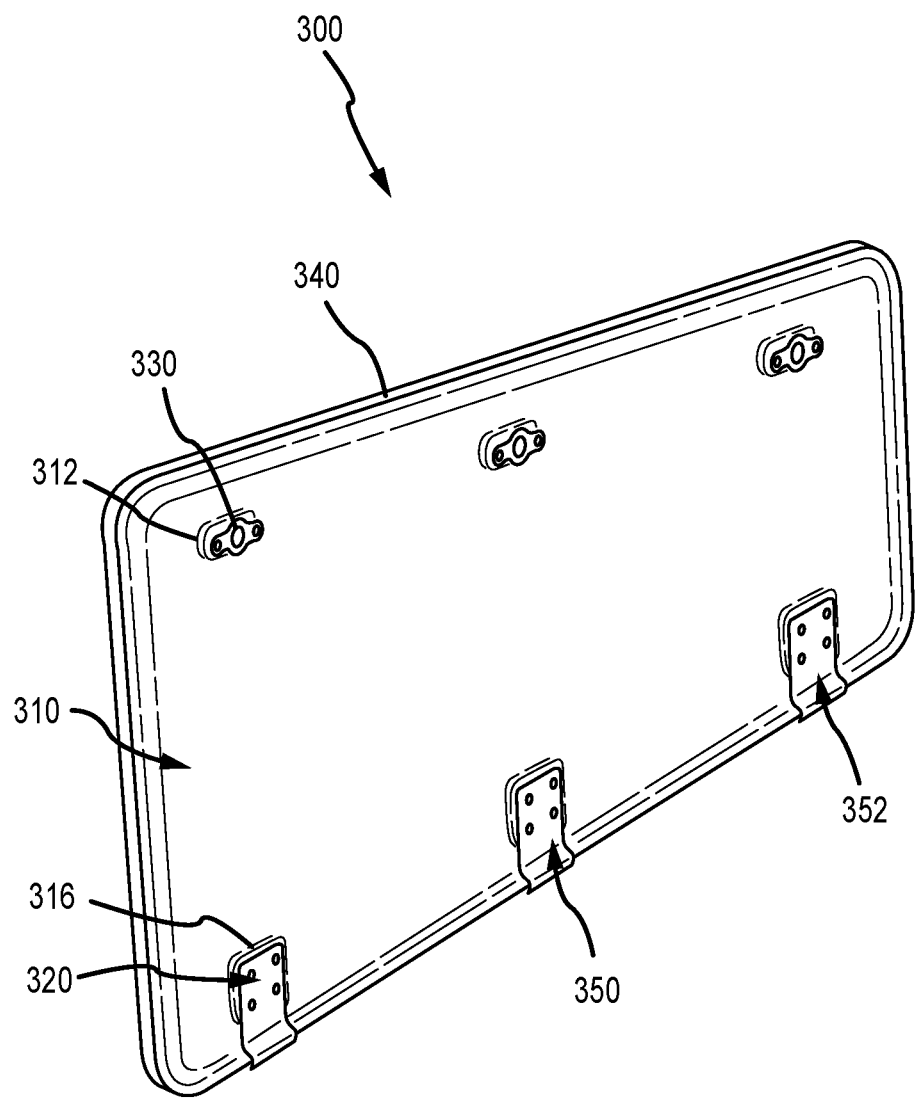
FIG. 3 illustrates a perspective view of a blowout panel, in accordance with various embodiments.

Referring now to FIG. 3, a perspective view of a blowout panel 300, in accordance with various embodiments, is depicted. The blowout panel 300 comprises a cover 310 and a first bracket 320. The first bracket 320 is coupled to the cover by any method known in the art, such as a mechanical fastener and insert connection, a pinned connection, or a riveted connection. In various embodiments, the first bracket 320 is riveted to the cover 310. In various embodiments, the cover 310 is made of a composite material, such as glass epoxy, carbon fiber epoxy, or any other material commonly used in the art. In various embodiments, the first bracket 320 is made of metal, such as stainless steel, a nickel alloy, titanium, aluminum, or any metal commonly used in the art. In various embodiments, the cover 310 comprises a first platform 312 disposed on a first surface of the cover 310. The blowout panel further comprises a first plate 330 disposed on the first platform 312 by any method commonly known in the art, such as a fastened connection. The first platform 312 and the first plate 330 are configured to receive a first ball lock of a packboard. The cover 310 further comprises a first bracket mount 316. The first bracket mount 316 is configured to receive the first bracket 320. In various embodiments, blowout panel 300 further comprises a seal 340 extending around the perimeter of cover 310. The seal 340 is bonded to the blowout panel 300 by any method commonly known in the art, such as through adhesive bonding or the like.

In various embodiments, the blowout panel 300 further comprises a second bracket 350 and a third bracket 352. Each bracket may be substantially similar in shape. The first bracket 320 may be disposed proximate a forward edge and a wing adjacent edge of the blowout panel 300. The second bracket 350 may be disposed axially adjacent to first bracket 320 at a position aft of first bracket 320 proximate the wing adjacent edge of the blowout panel 300. The third bracket 352 may be disposed axially adjacent to the second bracket 350 at a position aft of the second bracket 350 and proximate the wing adjacent edge and an aft edge of the blowout panel 300. The second bracket 350 may be mounted at a height above the wing adjacent edge that is substantially similar to the height of the first bracket 320 above the wing adjacent edge. Disposed opposite each bracket, proximate a fuselage adjacent edge of the blowout panel, may be a respective plate. For example, opposite the first bracket 320, proximate a forward edge and a fuselage adjacent edge of the blowout panel 300, is a first plate 330 coupled to the first platform 312 of the blowout panel 300. By aligning each plate with a respective bracket, the blowout panel 300 may release from a packboard more easily upon deployment of the evacuation system.

Figure 4:
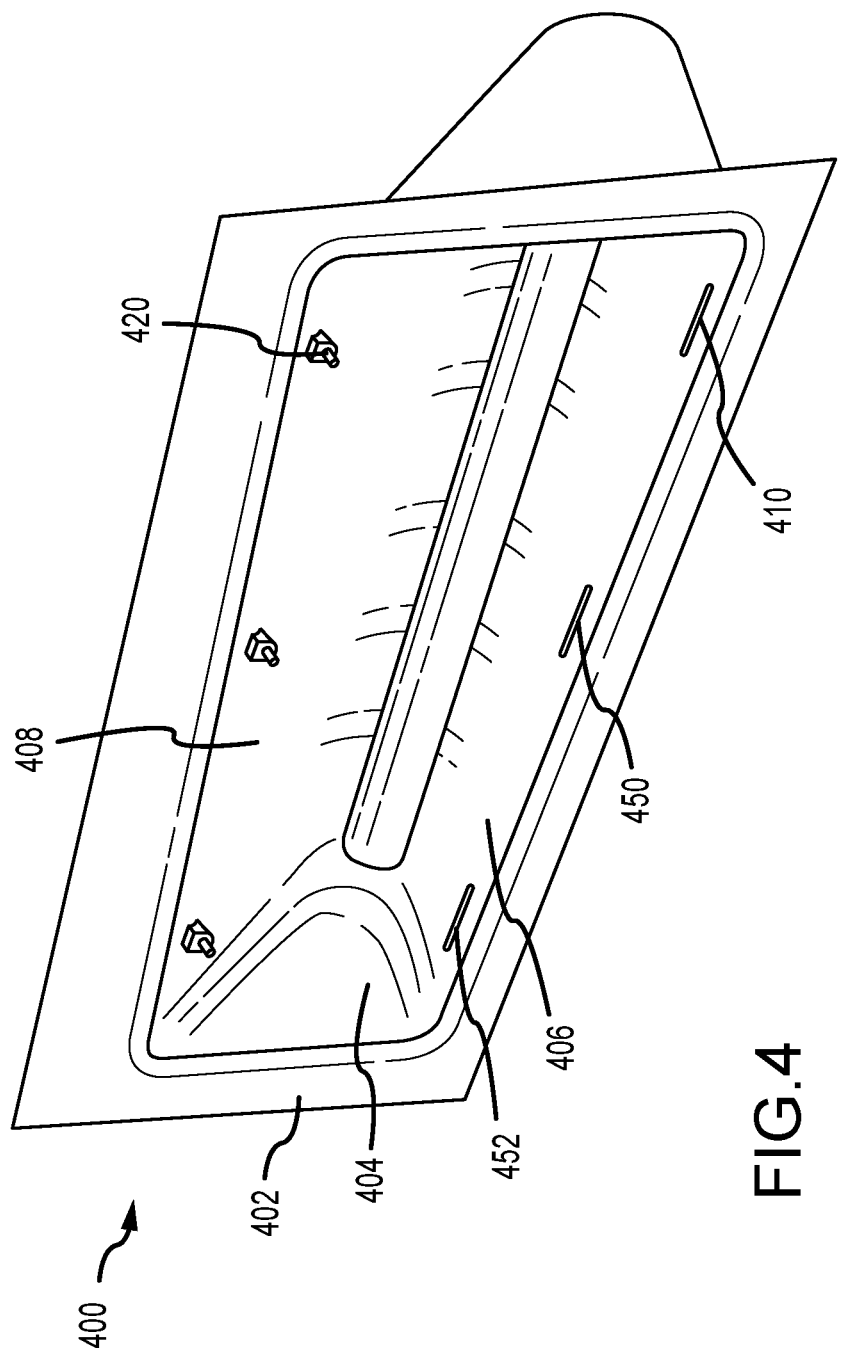
FIG. 4 illustrates a perspective view of a packboard compartment, in accordance with various embodiments.

Referring now to FIG. 4, a perspective view of a packboard 400, in accordance with various embodiments, is depicted. The packboard 400 comprises a flange 402 and a compartment 404 disposed within the flange. The compartment 404 comprises a bottom panel 406 and a top panel 408. The compartment is configured to receive an evacuation system 100, as described with reference to FIG. 1 above. In various embodiments, the flange 402 and the compartment 404 are a unitary component. The packboard 400 further comprises a first slot 410 disposed on the bottom panel 406 of the compartment 404. The first slot 410 is configured to receive the first bracket 320. In various embodiments, the packboard 400 further comprises a first ball lock 420 disposed proximate a forward edge and a fusalage adjacent edge of the top panel 408 of the packboard 400. With brief reference to FIGS. 3 and 4, the first ball lock 420 is configured to mate with the first plate 330 of the blowout panel 300 and secure the blowout panel 300 to the packboard 400. Similarly, the first slot 410 is configured to receive the first bracket 320 of the blowout panel 300 and secure the blowout panel 300 to the packboard 400. To release the blowout panel 300 from the packboard 400, the first ball lock 420 is actuated and releases the first plate 330 from the first ball lock 420.

In various embodiments, the packboard 400 further comprises a second slot 450 and a third slot 452. Each slot may be substantially similar in shape. The first slot 410 may be disposed at proximate a forward edge and a wing adjacent edge of the packboard 400. The second slot 450 may be disposed axially adjacent to first slot 410 at a position aft of first slot 410 proximate the wing adjacent edge of the packboard 400. The third slot 452 may be disposed axially adjacent to the second slot 450 at a position aft of the second slot 450 and proximate the wing adjacent edge and an aft edge of the packboard 400. The second slot 450 may be mounted at a depth from the wing adjacent edge that is substantially similar to the depth of the first slot 410 is from the wing adjacent edge. Disposed opposite each slot, proximate a fuselage adjacent edge of the packboard 400, may be a respective ball lock. For example, opposite the first slot 410, proximate a forward edge and a fuselage adjacent edge of the packboard 400, is a first ball lock 420 coupled to the top panel 408 of the packboard 400.

Figure 5:
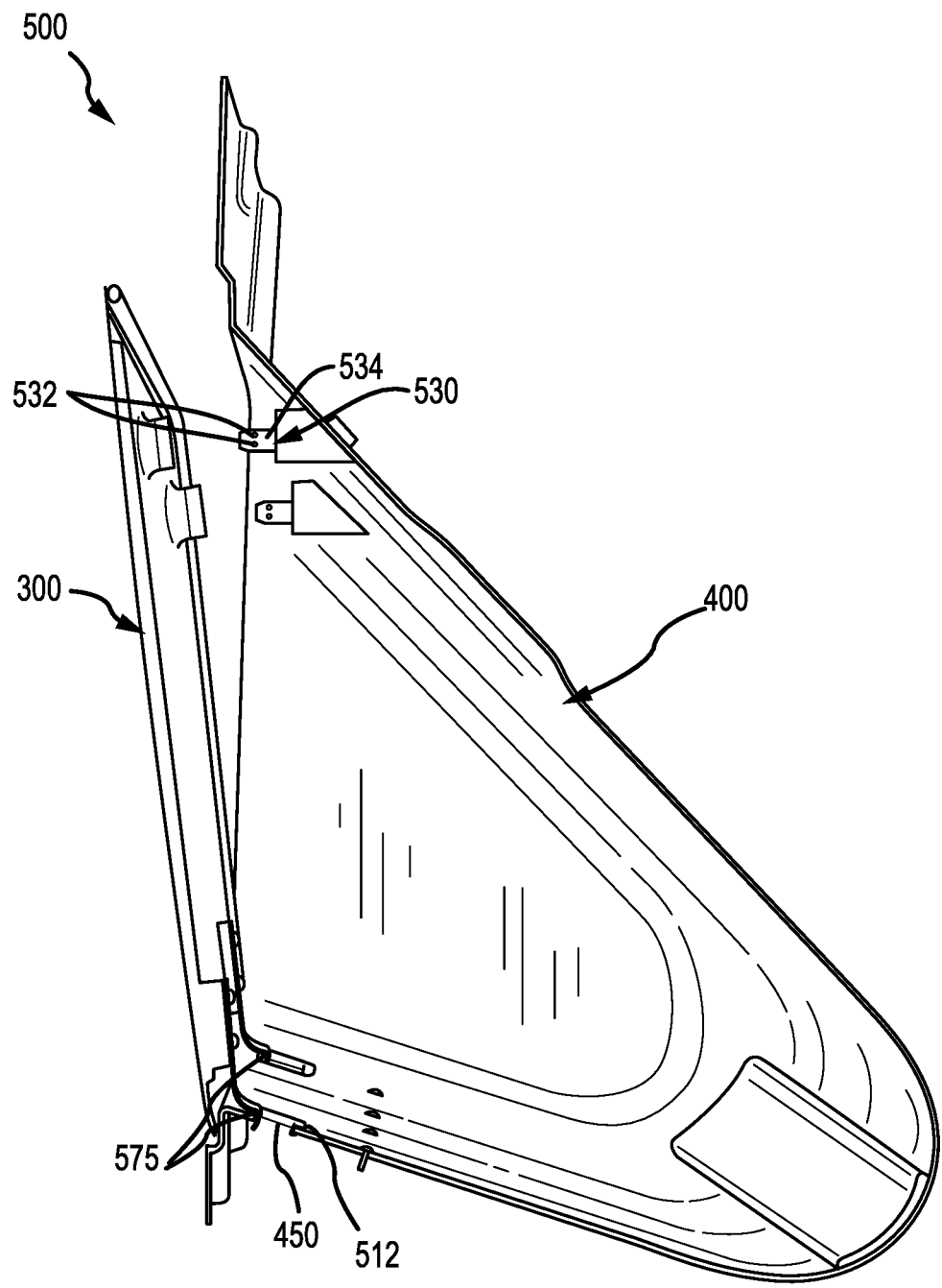
FIG. 5 illustrates a perspective view of a compartment assembly during assembly, in accordance with various embodiments.

Referring now to FIG. 5, a cross-sectional view of a compartment assembly 500 during assembly, in accordance with various embodiments, is depicted. The compartment assembly 500 comprises a blowout panel 300 and a packboard 400. During assembly, each bracket engages a respective slot. In various embodiments, the packboard 400 further comprises a second grommet 512 disposed in the second slot 450. Each slot in the packboard 400 may include a grommet disposed within the slot. For example, the second bracket 350 engages second grommet 512 disposed within the second slot 450. In various embodiments, the second grommet 512 may be made of a compliant material, such as a natural and/or synthetic rubber, silicone, PTFE neoprene, or the like. The second grommet 512 may protect the edge of the second slot 450 and/or prevent chafing of the edge of the second slot 450. The second grommet 512 may also provide additional friction to the second bracket 350 and dampen vibrations of the compartment assembly 500 while in use.

After each bracket engages a respective slot, the blowout panel 300 is pivoted about the bracket/grommet interfaces 575 and each plate on the blowout panel 300 engages a respective ball lock on the packboard 400. For example, with brief reference now to FIGS. 5 and 6A, second plate 520 is aligned with and engages second ball lock 530. Second balls 532, which are disposed circumferentially around a second piston 534 in in second ball lock 530, will be compressed upon assembly until it fits into the second plate 520, upon which the second balls 522 will expand within the second plate 520 and secure the blowout panel 300 to the packboard 400. The second ball lock 530 is made of metal, such as stainless steel, a nickel alloy, titanium, aluminum, or any metal commonly used in the art.

Figure 6A:
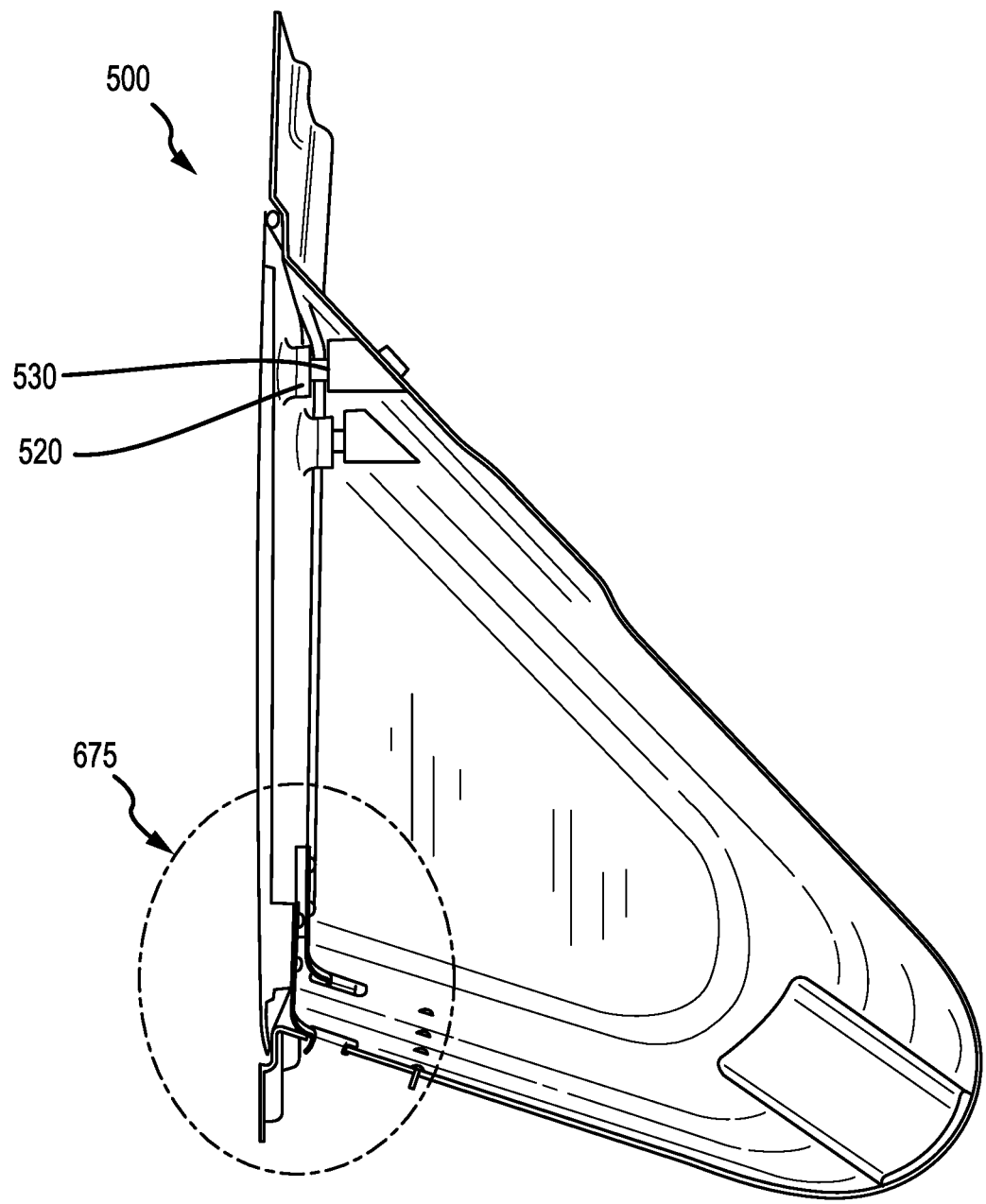
FIG. 6A illustrates a cross-sectional view of an assembled compartment assembly, in accordance with various embodiments.
Figure 6B:
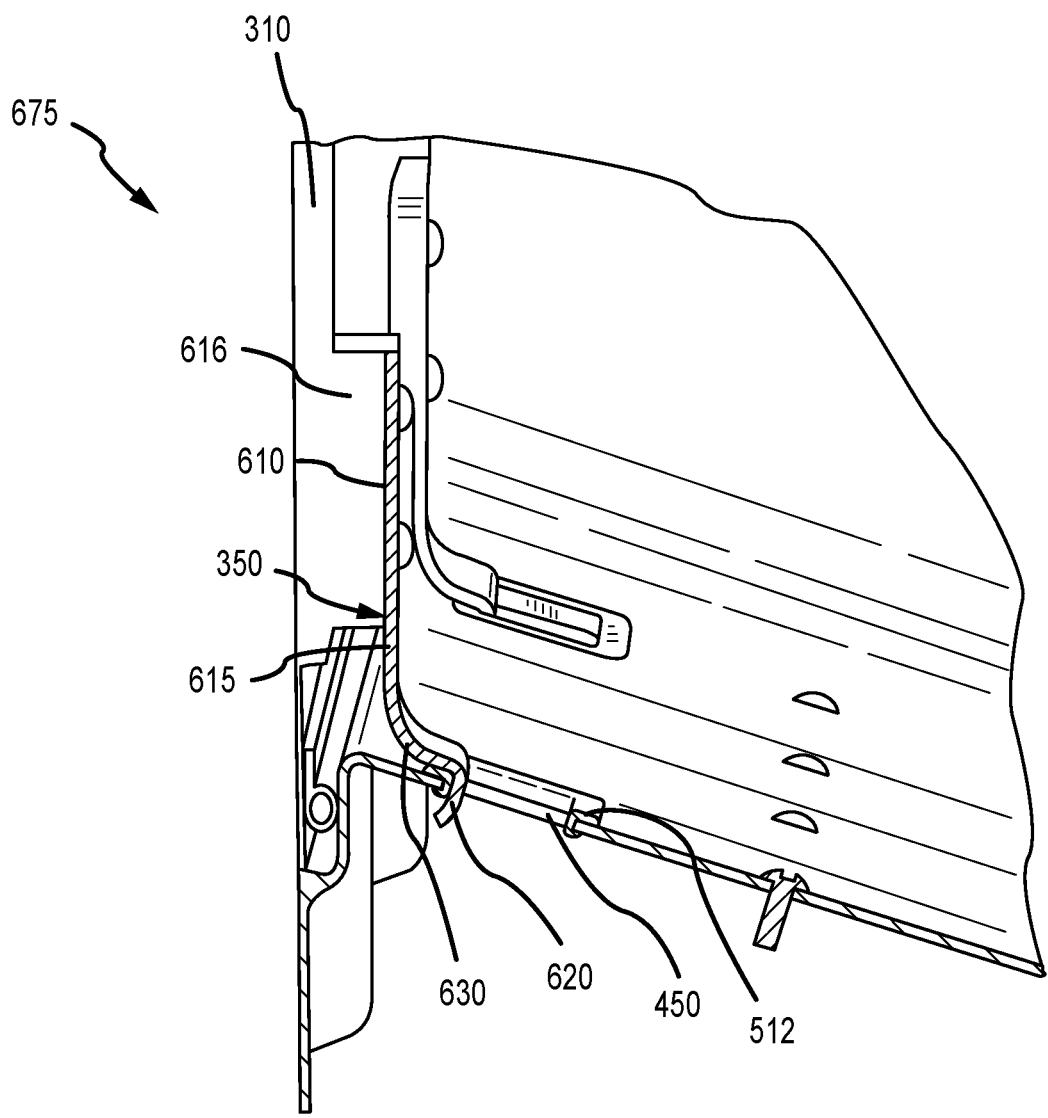
FIG. 6B illustrates a cross-section view of a portion of an assembled compartment assembly, in accordance with various embodiments.

Referring now to FIG. 6A, a cross-sectional view of a compartment assembly 500 after being assembled, in accordance with various embodiments, is depicted. The blowout panel 300 is secured to the packboard 400 via the ball lock lings and the bracket to grommet interfaces. For example, second ball lock 530 is coupled to second plate 520, and second bracket 350 engages second slot 450 and secures the blowout panel 300 to the packboard 400. Referring now to FIG. 6B, a portion 675 of an assembled compartment assembly from FIG. 6A, in accordance with various embodiments, is depicted. The second bracket 350 comprises a mating portion 610 and a lip portion 620. The mating portion 610 mates with a second bracket mount 616 of the cover 310. The second bracket 350 further comprises a flange 615 extending toward the wing adjacent edge of the cover 310. The bracket further comprises a curved portion 630 which curves away from the cover 310 and toward the second slot 450. In various embodiments, the lip portion 620 extends from the curved portion 630 and forms a substantially U-shaped portion. The lip portion 620 engages the second grommet 512. In various embodiments, second grommet 512 comprises a groove extending around a perimeter of the second grommet 512. The groove is configured to engage the perimeter of the slot at an outer surface of the bottom panel 406, an inner surface of the bottom panel 406, and a slot surface extending around a perimeter of the second slot 450. To install the second grommet 512, the second grommet 512 is compressed and placed into the second slot 450, then the grommet expends to its undeformed shape and presses against the perimeter of the second slot. Although described with respect to the second slot 450 and the second bracket 350, each bracket and slot interface may be substantially similar to the second slot 450 and the second bracket 350 interface.

In various embodiments, a slot and bracket interface, as described herein, may be easier to manufacture and less expensive than typical compartment assemblies for evacuation slides. A blowout panel with brackets, as disclosed herein, may be mechanically fastened by any method known in the art, and may eliminate additionally bonding in compartment assemblies for evacuation slides. Additionally, compartment assemblies, as described herein may be robust.

Figure 7:
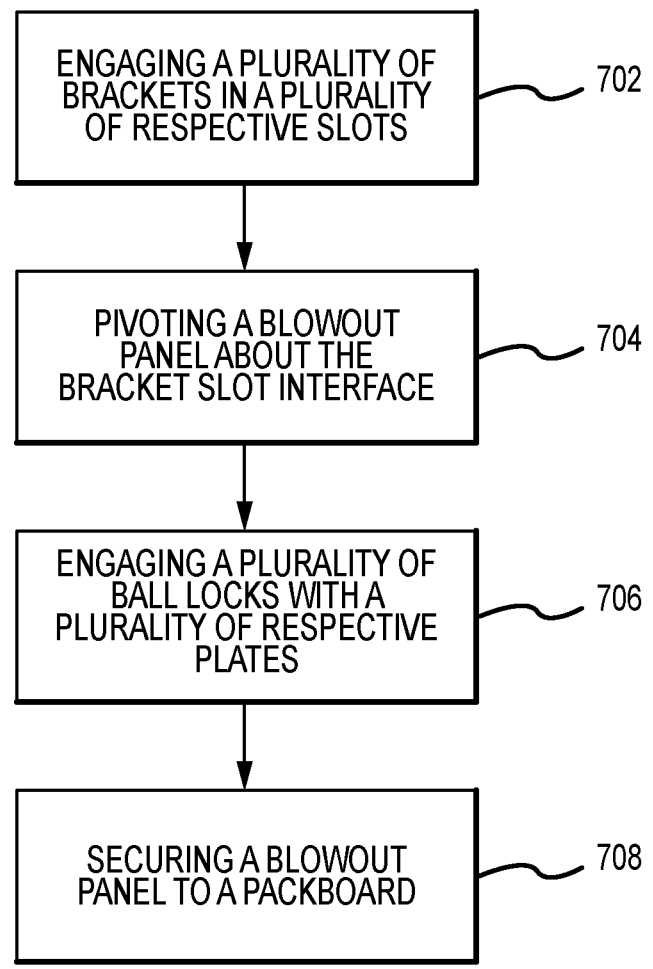
FIG. 7 illustrates a method of assembling a compartment assembly in accordance with various embodiments.

Referring now to FIG. 7, a method of assembling a compartment assembly, in accordance with various embodiments, is depicted. The method comprises engaging a plurality of brackets from a blowout panel in a plurality of respective slots from a packboard. Each bracket may be adjacent to a respective bracket in the plurality of brackets (step 702). Similarly, each slot may be adjacent to a respective slot in the plurality of slots. Each bracket may be disposed on a cover of a blowout panel proximate a wing adjacent edge of the blowout panel. Similarly, each slot may be disposed on a bottom panel of the packboard proximate a wing adjacent edge of the packboard. Next, the blowout panel is pivoted about the bracket to slot interface toward the packboard (step 704). Then, a plurality of ball locks disposed on a top panel of the packboard engage a plurality of respective plates disposed on a fuselage adjacent edge of the packboard (step 706). Each ball lock may be disposed opposite a respective slot on the packboard. Similarly, each plate may be disposed opposite a respective bracket on the blowout panel. Also, each ball lock may be disposed adjacent a respective ball lock, and each plate may be disposed adjacent a respective plate. Upon the plurality of ball locks engaging the plurality of respective plates, the blowout panel is secured to the packboard (step 708). Although described with reference to a plurality of brackets, slots, and ball locks, it is within the scope of this disclosure that a single bracket, slot, and ball lock may be utilized.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blowout panel for use in an aircraft evacuation system, the blowout panel comprising:
   a cover having a first bracket mount disposed proximate a first edge of the cover; and
   a first bracket disposed proximate a second edge of the cover, the second edge extending orthogonal from the first edge and forming a first corner of the cover, the first bracket comprising:
   a mating portion coupled to the first bracket mount;
   a flange extending from the mating portion toward the first edge of the cover;
   a curved portion extending from the flange away from the cover; and
   a lip portion extending from the curved portion toward the first edge of the cover;
   a second bracket disposed adjacent to the first bracket, the cover configured to pivot about a hinge line at least partially defined by the lip portion of the first bracket and the second bracket in response to an evacuation slide being released; and
   a first plate disposed adjacent to the first bracket at a first width from the second edge, the first bracket being the first width from the second edge, the first plate configured to receive a ball lock.

2. The blowout panel of claim 1, wherein the mating portion is coupled to the first bracket mount via a mechanical fastener.

3. The blowout panel of claim 1, further comprising a third bracket disposed adjacent to the second bracket at a height from the first edge.

4. An aircraft comprising:
   a compartment assembly, comprising:
   a blowout panel including a first bracket, a first plate and a cover, the first bracket disposed proximate a first edge of the cover, the first bracket having a lip portion, the first bracket disposed proximate a second edge of the cover, the second edge extending orthogonal from the first edge and forming a first corner of the cover, the first plate disposed adjacent to the first bracket at a first width from the second edge, the first bracket being the first width from the second edge, the first plate configured to receive a ball lock; and
   a packboard including a flange and a compartment disposed within the flange, the compartment comprising a bottom panel and a top panel, the bottom panel comprising a first slot disposed therein, the lip portion of the first bracket engaging the first slot, the blowout panel configured to pivot about a hinge line defined by an interface between the lip portion and the first slot in response to releasing an evacuation slide from the compartment assembly.

5. The aircraft of claim 4, further comprising a fuselage and a wing fixed to the fuselage, the compartment assembly disposed on the fuselage proximate the wing.

6. The aircraft of claim 4, wherein the first bracket further comprises a mating portion, wherein the mating portion is mechanically coupled to the cover.

7. The aircraft of claim 4, wherein the packboard further comprises a first ball lock disposed opposite the first slot, wherein the first ball lock is coupled to the first plate.

8. The aircraft of claim 4, wherein the packboard further comprises a grommet disposed in the first slot, the grommet engaging the lip portion of the first bracket.

9. The aircraft of claim 8, wherein the grommet comprises a groove that engages an outer surface of the bottom panel, an inner surface of the bottom panel, and a perimeter surface of the first slot.

10. The aircraft of claim 4, wherein the blowout panel further comprises a second bracket, the second bracket disposed axially adjacent to the first bracket at a height from the first edge, the first bracket being the height from the first edge of the first bracket.

11. The aircraft of claim 10, wherein the blowout panel further comprises, a third bracket disposed adjacent to the second bracket at the height from the first edge.

12. A method of assembling a compartment assembly for an aircraft evacuation system, the method comprising:

engaging a plurality of brackets from a blowout panel in a plurality of respective slots from a packboard, the plurality of brackets spaced apart from a first edge of a cover of the blowout panel;

pivoting the blowout panel about a hinge line created by an interface between the plurality of brackets and the plurality of respective slots, the pivoting being towards the packboard; and engaging a first plate of the blowout panel with a ball lock disposed on a top panel of the packboard in a respective plate disposed on a fuselage adjacent edge of the packboard, wherein:

each bracket in the plurality of brackets comprises a lip portion, each lip portion engages a respective slot in the plurality of respective slots, a first slot in the plurality of respective slots is spaced apart from a second slot in the plurality of respective slots, the first plate disposed adjacent to a first bracket in the plurality of brackets at a first width from a second edge, the first bracket being the first width from the second edge, the second edge extending orthogonal from the first edge and forming a first corner of the cover.

13. The method of claim 12, further comprising securing the blowout panel to the packboard.

* * * * *